Oct. 23, 1956    R. W. PEARSON ET AL    2,768,282
HOT UPSETTING MACHINE
Filed Jan. 5, 1955    7 Sheets-Sheet 1

INVENTORS
Hans H. Hansen and Roy W. Pearson
BY Francis J. Klempay
ATTORNEY

INVENTORS
Hans H. Hansen and Roy W. Pearson

Hans H. Hansen and Roy W. Pearson

Oct. 23, 1956   R. W. PEARSON ET AL   2,768,282
HOT UPSETTING MACHINE
Filed Jan. 5, 1955   7 Sheets-Sheet 5
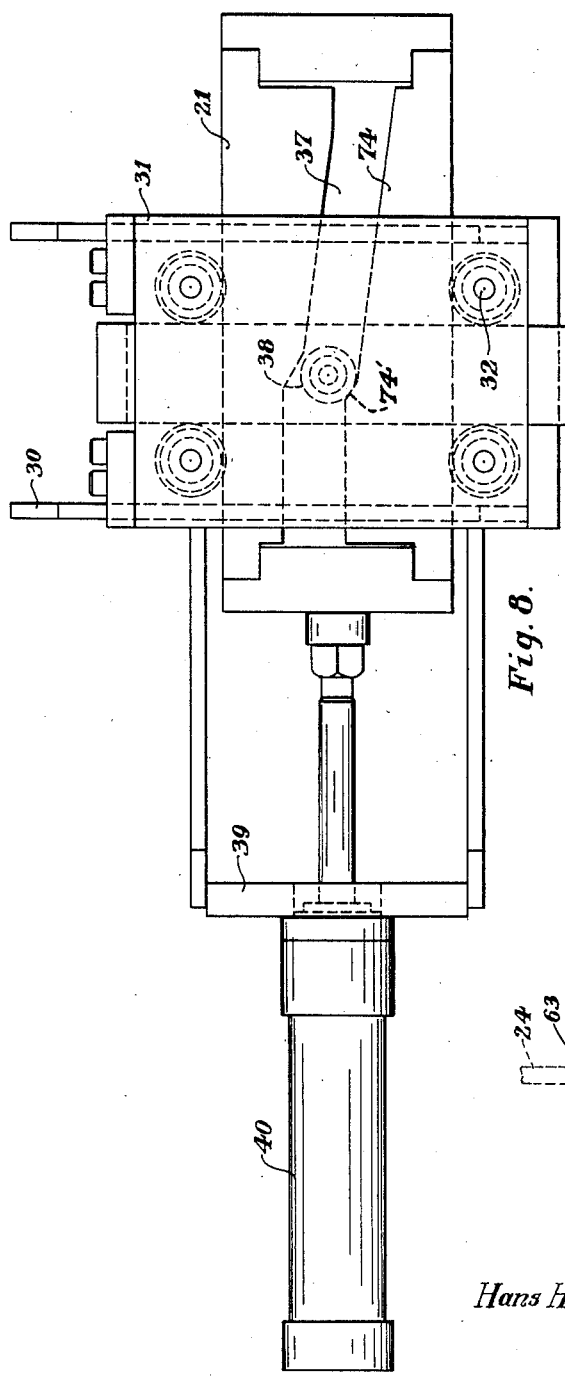
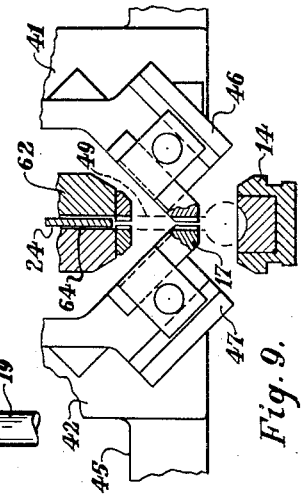
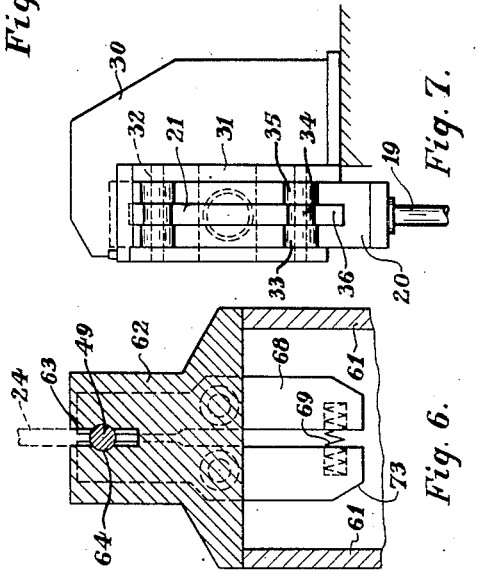
INVENTORS
*Hans H. Hansen and Roy W. Pearson*
BY *Francis J. Klempay*
ATTORNEY Oct. 23, 1956  R. W. PEARSON ET AL  2,768,282
HOT UPSETTING MACHINE
Filed Jan. 5, 1955  7 Sheets-Sheet 6

INVENTORS
*Hans H. Hansen and Roy W. Pearson*

BY *Francis J. Klempay*
ATTORNEY

United States Patent Office 2,768,282
Patented Oct. 23, 1956

2,768,282

HOT UPSETTING MACHINE

Roy W. Pearson, Warren, and Hans H. Hansen, Cortland, Ohio, assignors to The Taylor-Winfield Corporation, Warren, Ohio, a corporation of Ohio Application January 5, 1955, Serial No. 479,903

20 Claims. (Cl. 219—151)

The present invention relates to the metal working and forming art, and more particularly to an apparatus for the electric resistance heating and hot forming of metal workpieces into desired shapes and sizes.

In the production of valve members for internal combustion engines, and of other parts having a generally small shank or stem portion with a bulbous section of material at some point along such stem, it has been common practice to employ "hot upsetting" methods, wherein a workpiece of relatively small cross section is heated through a localized area to the point of plasticity, whereupon pressure is applied to the ends of the workpiece to upset or gather a large bulb-like quantity of material conforming somewhat in shape and size to the desired end product. This procedure is often preferred over forging operations, for example, as being faster, simpler, more economical, and productive of superior results.

Generally, in hot upsetting operations, a desired area of the workpiece is heated by bringing current carrying electrode members into contact therewith and passing a high amperage current through the desired localized area whereby the same becomes resistance heated to a plastic condition. As pressure is applied between the ends of the workpiece material flows into and gathers within the area between the electrodes. The shape and size of the bulb of gathered material may be varied by controlling the rate of flow of heating current, the application of upsetting pressure, and by adjusting the position of the current carrying electrodes; and it will be readily understood that it may be desirable in many cases to effect such adjustments during the progress of a hot upsetting operation so that the final shape of the bulb may be accurately controlled.

All of the above is well known, generally, in the art. However, insofar as we are aware, apparatus heretofore devised for carrying out hot upsetting operations has been of a more or less limited nature, capable of only low rates of production, and in most cases requiring the close personal attention and supervision of the machine operator. It is therefore the primary or ultimate object of this invention to provide an apparatus of a novel and improved nature for carrying out hot upsetting operations in a substantially automatic manner at a high rate of production.

More specifically, it is an object of the invention to provide an improved hot upsetting apparatus having novel arrangements for feeding workpieces into operative relation in the machine, for engaging the workpiece within the machine, and for carrying out the upsetting operation in an accurate and consistent manner, all without substantial attention or supervision on the part of a machine operator.

One of the individual specific objejcts of our invention resides in the provision of a novel transfer mechanism for receiving workpieces from a storage bin and feeder therefor and transferring the same to the hot upsetting machine in a rapid, automatic and accurate manner whereby the workpiece may be properly gripped and positioned between current carrying electrodes and whereby the finished product may be automatically removed and discharged at the end of an operation.

In combination with the above, our invention seeks to provide a novel apparatus having active cooperation with the feeding and transfer mechanism above described for applying pressure to the workpiece during an upsetting operation in such manner that the workpiece is properly guided and supported throughout substantially the whole of its length. Thus, in accordance with the teachings of the invention the transfer mechanism is provided with means for properly aligning and orienting a workpiece prior to its being carried into the upsetting machine proper, which same aligning and orienting means serves actively to support and guide the workpiece during the application of upsetting pressures thereto.

Another object of the pressure invention resides in the provision of a novel and improved arrangement for mounting and actuating a pair of current carrying electrodes so that the same may be opened and closed in a precise and accurate manner for gripping a workpiece upon positioning of the latter in properly aligned and oriented manner in the upsetting apparatus.

Another object of the invention is the provision of a novel arrangement for movably mounting a pair of work engaging electrodes so that the position of the same on the workpiece may be adjusted during the progress of the upsetting operation in a precise and accurately controllable manner whereby the final configuration of the finished workpiece may be maintained within relatively close commercial tolerances in all cases. In respect to this object it is a further specific object of the invention to provide a novel and simplified yet highly accurate mechanism for controllably moving the workpiece engaging electrodes during the upsetting operation, and to provide an improved arrangement for anti-frictionally supporting the electrodes so that the controlled movements thereof take place in a smooth and uniform manner, the electrodes being at all times firmly retained in accurate alignment with the principal or operatingg axis of the upsetting mechanism.

Yet another object of the invention resides in the provision in an apparatus of the type and having the characteristics set forth above of an improved actuating and control system therefor whereby the several steps of an upsetting operation may be carried out rapidly and automatically, and in a precision manner, all in accordance with the requirements of a commercially acceptable apparatus capable of high production output with minimum supervision.

The above and other objects and advantages of the invention will become apparent upon full consideration of the following detailed specification and accompanying drawing wherein is disclosed a certain preferred embodiment of the invention.

In the drawing:

Figure 6 is an enlarged fragmentary section view taken generally along line VI—VI of Figure 1;

Figure 7 is an end elevation of our improved mechanism for controllably moving the work engaging electrodes of the apparatus of Figure 1;

Figure 8 is an enlarged side elevation of the mechanism of Figure 7;

Figure 9 is an enlarged fragmentary view, partly in section of the work engaging electrodes of our apparatus, showing the work supporting and guiding means employed in conjunction therewith;

Figure 1:
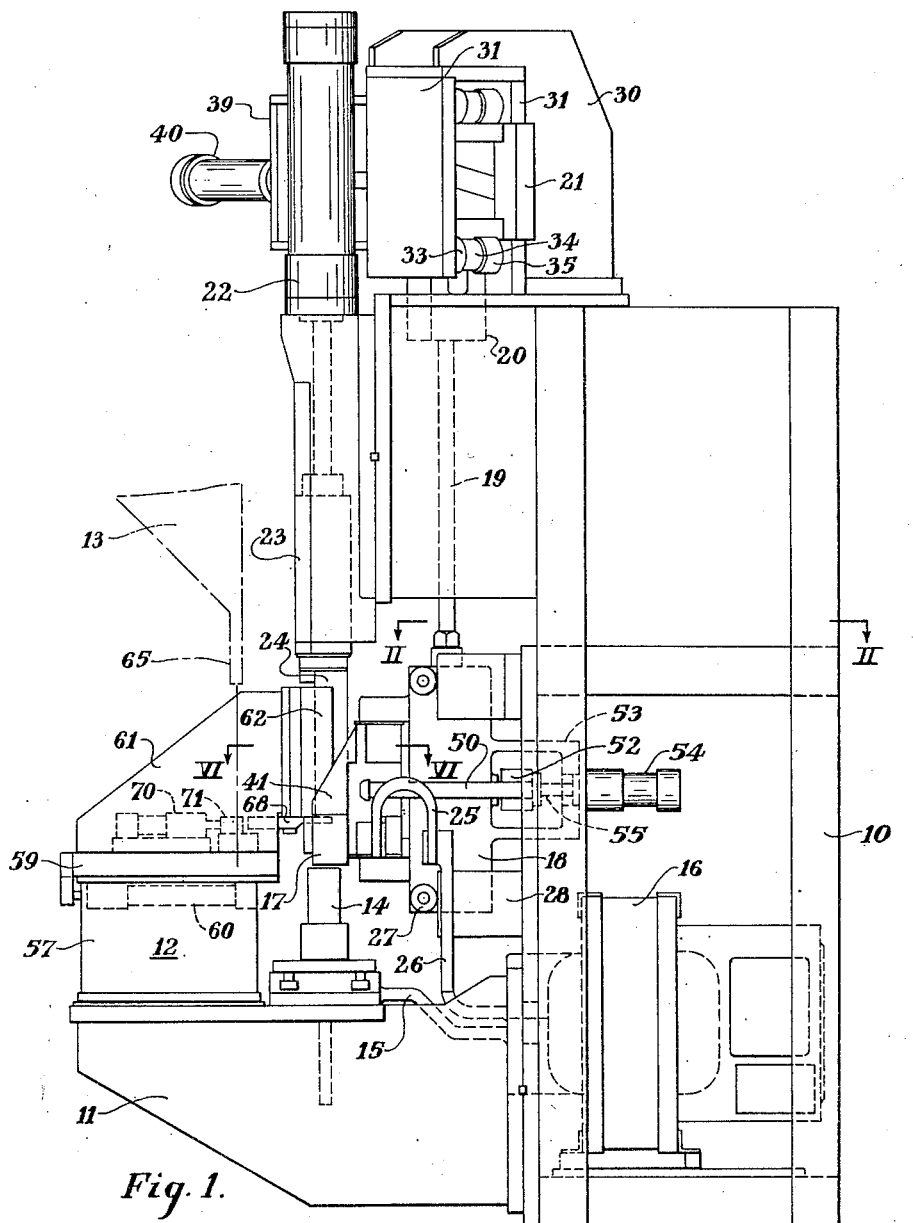
Figure 1 is a side elevation of a hot upsetting apparatus constructed in accordance with the teachings of our invention.
Figure 5:
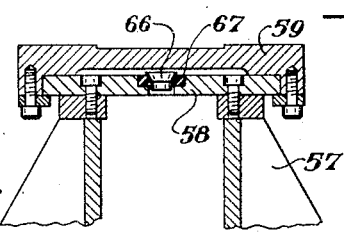
Figure 5 is a fragmentary section view taken generally along line V—V of Figure 4.

Referring now to the drawing, and initially to Figure 1 thereof, the reference numeral 10 designates generally the main framework of our hot upsetting apparatus which mounts at its lower front portion a knee or support 11. Positioned on the support 11 is a transfer mechanism, generally indicated at 12 which is adapted to receive workpieces from a storage bin and feeder mechanism therefor, generally indicated at 13. Positioned inwardly of the transfer mechanism 12, on the support 11, is a pedestal-like member 14 which comprises an anvil electrode for our upsetting apparatus, the electrode 14 being connected by means of conductor 15 to one terminal of a low voltage-high amperage transformer 16 housed within the framework 10.

Above the anvil electrode 14 are positioned clamp-like work engaging electrodes 17, to be hereafter more fully described, which are mounted upon a carriage 18 which is antifrictionally guided on the framework 10. Extending upwardly from the carriage 18 is an actuating rod 19 connecting a guided member 20 which is actuated by means of an anti-frictionally mounted cam 21.

Mounted on the frame 10, forwardly of the carriage 18 and actuating mechanism therefor, is a vertically disposed hydraulic cylinder 22 which operates a guided slide or ram 23 mounting a pusher blade 24 at its lower end. The pusher blade 24 is aligned with the clamping electrodes 17 and anvil electrode 14 so that a downward pushing force may be exerted upon a workpiece engaged by the clamping electrodes 17 to urge the workpiece toward the anvil electrode 14.

In accordance with usual practice the movable clamping electrodes 17 are connected by means of flexible conductors 25 and fixed conductors 26 to the second terminal of transformer 16. The arrangement is such that when a workpiece is clamped between electrodes 17 and held in pressure engagement with the anvil electrode 14 electric current may be passed through the portion of the workpiece between the electrodes to heat the same to a plastic state, at which time the pressure or pushing force applied by means of the blade 24 cause the heated portion of the workpiece to deform. As the work deforms new portions thereof slide through the clamping electrode and become heated and in turn deform so that there is a continuous flow of material which gathers into a sizable bulb between the electrodes 14 and 17.

As set forth in U. S. Patent No. 1,849,185 to Giacchino, for example, it is often desirable during the upsetting operation to change the relative positioning of the electrodes 14 and 17 so that the direction of flow of the plastic material, and consequently the contour of the bulb of gathered material may be varied in a desired manner. To this end we propose to move the clamping electrodes 17 progressively away from the anvil electrode 14 at an accurately controlled rate of speed, so that as the bulb of material gathering between the electrodes increases in size the space between the electrodes becomes greater.

Figure 2:
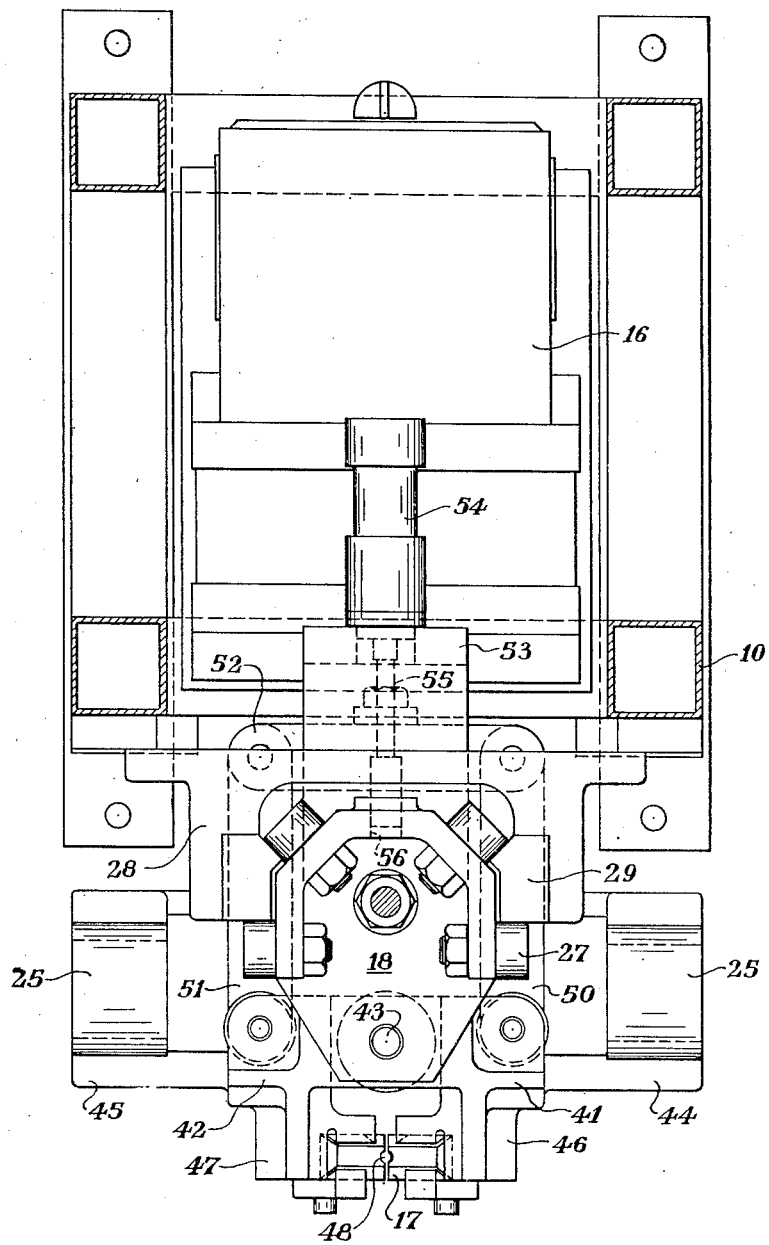
Figure 2 is a fragmentary section view taken generally along line II—II of Figure 1.
Figure 3:
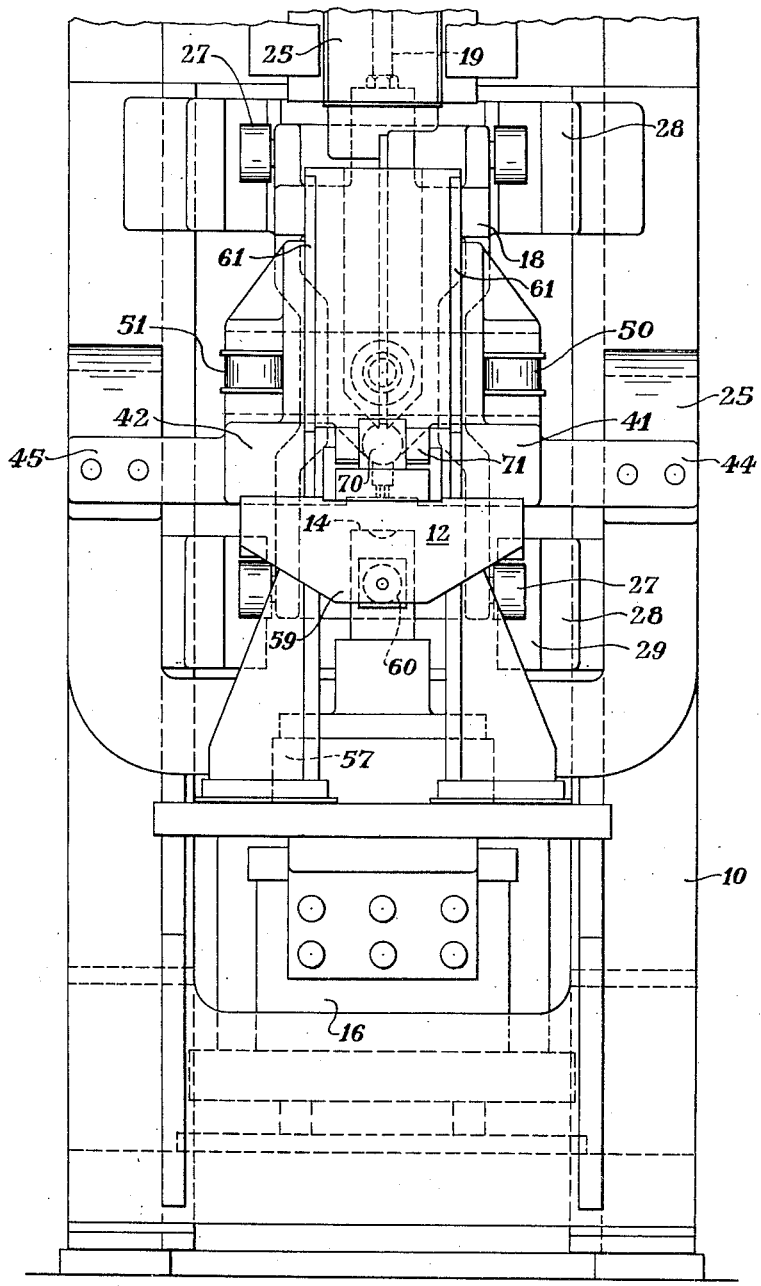
Figure 3 is an enlarged fragmentary front elevation of the apparatus of Figure 1.
Figure 4:
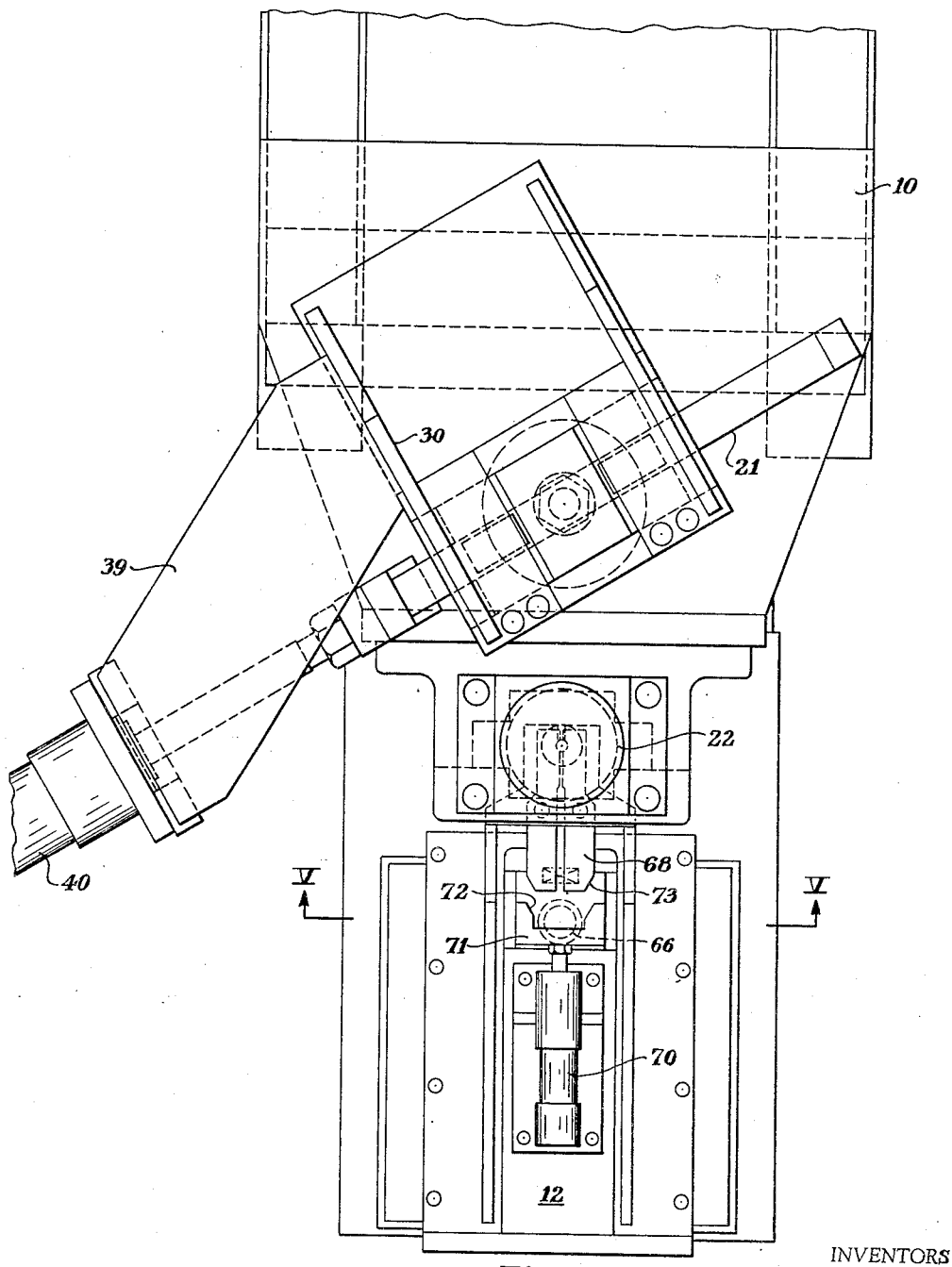
Figure 4 is an enlarged fragmentary top plan view of the apparatus of Figure 1.

Referring now to Figure 2 of the drawing, the electrode supporting carriage 18 mounts a plurality of pairs of angularly related anti-friction rollers 27, there being two such pairs of rollers at each the upper and lower ends of the carriage. Mounted rigidly upon the frame 10 are spaced brackets 28 which are more or less U-shaped, opening in a forwardly direction. In each of the brackets 28 are mounted oppositely disposed inserts 29 having hardened and ground bearing surfaces thereon disposed in angularly related directions. In the illustrated apparatus, there are four such inserts, one for each of the several pairs of anti-friction rollers. As will be observed in Figure 2, the bearing inserts 29 cooperate with the rollers 27 to accurately position and guide the carriage 18 in vertical movements; and in accordance with our preferred practice in such cases the bearings and rollers are pre-loaded, by means of shims or wedges, not specifically shown, placed behind the bearings 29, so that there is absolutely no looseness or "play" in the movements of the carriage 18.

Referring now to Figures 1, 7 and 8, there is mounted at the top of the frame 10 an actuating mechanism for the carriage 18 which comprises a pair of spaced vertically disposed plates 30 which support at their forward edge portions a second pair of plates 31 which are also vertically disposed, but which are arranged transversely to the first mentioned plates 30. At four spaced points on the plates 31 there are mounted shafts 32 which rotatably support, between the plates 31, three anti-friction rollers 33-35. In the illustrated embodiment of the invention the outer rollers 33 and 35 of each set are of larger diameter and constitute a vertical anti-friction guide way for the member 20 which connects through rod 19 with the electrode supporting carriage 18.

As shown in Figure 7, the guided member 20 is provided with a vertically elongated slot or opening 36 extending therethrough in the direction of the plates 31. Received within the opening 36 and guided and supported for horizontal movement by the rollers 34 is the cam member 21 which is provided with a cam slot 37 as shown in Figure 8. The slot 37 is inclined generally from right to left, and receives between its upper and lower walls a roller or follower 38 carried by the guided member 20. Thus, upon a left-to-right movement of the cam 21 the follower 38 is raised in accordance with a predetermined pattern of movement, thereby lifting the guided member 20 and electrode mounting carriage 18 connected thereto.

Mounted on the left hand one of the plates 30, as shown in Figure 8, is a horizontally disposed generally U-shaped bracket 39 which supports at its outer end a hydraulic cylinder 40. The cylinder 40 is drivingly engaged with the cam 21 for moving the same in a horizontal direction in the manner desired.

The above described arrangement for raising and lowering the electrode mounting carriage 18 constitutes an important feature of this invention. As will be understood, the retracting movements of the carriage 18 during an upsetting operation must be controlled with high precision. Thus, where the carriage is connected directly to a hydraulic cylinder, for example, such cylinder must be actuated slowly, smoothly and uniformly throughout the whole of the operation, a condition which is for all practical purposes impossible of obtainment since variations in such factors as the temperature of the hydraulic fluid will cause noticeable variations in rate of movement of the cylinder operator where the same is operated at very slow speed. In the apparatus of our invention, on the other hand, the cylinder 40 may be operated at a relatively high rate of speed over a relatively long stroke so that variations in oil viscosity and the like have little effect on the controlled carriage movement. Moreover, the cam slot 37 may be provided with various contours so that articles of intricate and unusual shape may be formed between the electrodes 14 and 17, even though the actuating cylinder 40 is operated at a uniform rate of speed.

Referring now to Figures 1, 2 and 9, it will be observed that the carriage 18 comprises a pair of electrode supporting arms 41 and 42 which are pivotally mounted on a common vertical axis 43 at the forward side of the carriage, in electrically insulated relation thereto. Extending outwardly of each of the arms 41 and 42 are pads 44 and 45 respectively which are connected with flexible conductors 25. Forwardly of the pivot axis 43 the arms 41 and 42 are provided with electrode mounting portions 46 and 47 respectively, in each of which there is formed a downwardly inclined dovetailed slot for the adjustable reception of a work clamping electrode 17.

Each of the electrodes 17 is provided with a vertically disposed semi-circular recess or groove 48 so that when the arms 41 and 42 are pivoted to a closed position the grooves 48 define a vertical aperture for the reception of a vertically disposed rod-like workpiece 49, as indicated by broken lines in Figure 9.

For actuating the arms 41 and 42 to open and close the work clamping electrodes 17 we have provided a novel arrangement comprising a pair of driving links 50 and 51 which are pivotally connected to the arms 41 and 42 in insulated relation thereto. The links 50 and 51 extend rearwardly from the arms 41 and 42 and are pivotally connected at their rearward ends to a common transverse driving member 52.

At the back of the carriage 18 there is provided a mounting pad 53 having a transverse window therein for the reception of the driving member or link 52. At the rear of the pad 53 is mounted a hydraulic cylinder 54 having a forwardly extending actuating rod 55 which is rigidly connected to the driving link 52. And in accordance with the teachings of the invention the actuating rod 55 extends through the driving link 52 and is slidably received in a bore 56 provided at the back side of the carriage proper. In this manner the driving link is rigidly held in its proper orientation, and upon actuation of the cylinder 54 the link 52 moves purely in a forward or rearward direction. This feature is important since it insures the proper closing of the electrodes 17 upon the operating axis of the machine. That is, once the electrodes have been adjusted within the mounting portions 46 and 47 therefor all opening and closing movements will be in accurate symmetry with respect to the operating axis.

For loading workpieces into the upsetting apparatus we provide a novel workpiece transfer mechanism which is adapted to receive individual workpieces from a storage bin 13 therefor and to transfer the same, properly oriented, into alignment with the operating axis of the machine, whereupon the clamping electrodes 17 are closed upon the workpiece and the upsetting operation initiated. Referring to Figures 1, 3, 4, 5 and 6, the reference numeral 57 designates a supporting structure which is mounted upon the main knee or support 11 of the machine and which carries a platform 58. Slidably mounted on the platform 58 is a transfer table 59 which is provided at its forward end with downwardly extending means engaging the actuating rod of a transfer cylinder 60.

Mounted upon the transfer table 59 are spaced upstanding brackets 61 which extend toward the machine frame 10, and which mount at their forward end portions a forwardly projecting guide member 62, shown best in Figures 1 and 6. In accordance with the teachings of the invention the guide member is provided with a vertically disposed inwardly opening slot 63 which is adapted to closely receive the pusher blade 24 and guide the same in vertical movements. In addition, there are provided in the slot 63 oppositely facing arcuate grooves 64 which are arranged to slidably receive, guide and support the shank of a workpiece 49. As will be observed in Figure 6, the slot 63 and blade 24 are somewhat smaller than the diameter of the workpiece 49 so that the latter may be properly guided within the groove 64, while at the same time providing ample space for the reception of the pusher blade 24 which bears upon the upper end of the workpiece.

In order to compensate for wear upon the arcuate grooves 64 we may form the guide member of two pieces, separated by suitable shims, not shown, which may be progressively removed or replaced as wear takes place.

In order to load a workpiece into the transfer mechanism the cylinder 60 is actuated to move the transfer table 59 to a forward or retracted limit position, in which position the arcuate grooves 64 of the guide member 62 are in vertical alignment with the delivery chute 65 of the storage bin 13. The bin 13 and chute 65 may be of any conventional design, and have associated therewith a suitable feeder device, not specifically shown, which also may be of any conventional design, which is adapted to feed vertically disposed workpieces downwardly out of the chute 65 on a one-at-a-time basis.

Mounted in the table supporting platform 58, in vertical alignment with the delivery chute 65 is an abutment member or stop 66 (see Figure 5) which is resiliently supported by means of a suitable rubber grommet 67. When the transfer table 59 is moved into a retracted position the stop 66 is uncovered in underlying relation to the arcuate grooves 64 of the guide member. Thus, when a workpiece is delivered from the chute 65 it drops through the grooves 64 until it engages the stop 66, the upper surface of which is positioned slightly above the supporting platform 58 and also slightly above the top of the anvil electrode 14.

To hold the thus positioned workpiece during transfer movement of the workpiece from the delivery or loading station into the upsetting apparatus we have provided a novel clamping mechanism comprising a pair of clamping jaws 68 which are pivotally mounted at the bottom of the guide member 62, on each side of the vertical slot 63 therein, substantially in the manner shown in Figure 6. Adjacent the outer ends of the jaws 68 there is provided a spring 69 which acts outwardly upon the jaws, tending to spread the outer ends thereof, and thereby tending to close the inner ends. Adjacent the inner ends of the jaws there are provided arcuate recesses which are aligned with the grooves 64 of the guide member 62, the arrangement being such that when a workpiece 49 is loaded into the guide member 62 the lower end portion of the workpiece may be gripped by the jaws with a resilient force determined by the spring 69. The gripping force is sufficient to readily support the entire weight of the workpiece, but is preferably not appreciably in excess of such value so that the workpiece may easily slip through the jaws during the upsetting operation.

To open and close the workpiece gripping jaws 68 at proper times there is mounted on the transfer table a short stroke hydraulic cylinder 70, the actuating rod of which mounts a cam 71 having inwardly facing angular cam surfaces 72. The cam 71 is positioned directly behind the outer ends of the jaws 68, and in accordance with the teachings of the invention the outer ends of such jaws are provided with angular cam surfaces 73 which are generally complementary to those of the cam 71. Thus, upon extending movement of the cylinder 70 the cam 71 engages the jaws 68 in such manner as to force the outer ends together, opening the inner or gripping ends to release a workpiece held therein, or to permit the insertion of a new workpiece.

When the transfer table 59 is moved into retracted or loading position beneath the discharge chute 65, cylinder 70 is energized to move the cam into engagement with jaws 68 to open the same. At this time a workpiece is dropped through the grooved slot 63 into abutting engagement with the stop 66. Cylinder 70 is then retracted to close the jaws 68 upon the workpiece, and transfer cylinder 60 is energized to move the workpiece into alignment with the operating axis of the upsetting machine. And it will be understood, in this connection, that the lower end of the workpiece will be supported slightly above the surface of the platform 58 as well as slightly above the anvil die or electrode 14.

After the workpiece is properly aligned, cylinder 54 is actuated to close the clamping electrodes 17 upon the workpiece, adjacent the lower end thereof. Following this the ram cylinder 22 is actuated to lower the pusher blade 24, pushing the workpiece 49 through the gripping jaws 68 and clamping electrodes 17 until it engages the anvil electrode 14. When a predetermined contact pressure is established between the workpiece 49 and anvil electrode 14 transformer 16 is energized, causing current to flow between the then closed clamping electrodes 17 and the anvil electrode 14, through the lower end portion of the workpiece.

As the lower end of the workpiece becomes heated and softened due to the resistance thereof to the flow of current the soft portion yields under the pressure of the pusher blade 24. This causes a bulb-like formation or gathering of material between the electrodes 17 and 14, and new and unheated portions of the workpiece are continuously moved into the area between the electrodes so that a continuous heating, deforming and building-up of the material takes place.

During the progress of the upsetting operation the cam actuating cylinder 40 is energized so that its operating rod extends at a controlled rate of speed. The cam 21 is thus moved from left to right, causing the follower 38 to be raised progressively upon the surface 74 defining the lower edge of the cam slot 37. This of course causes the electrode mounting carriage 18 to retract upwardly at a predetermined rate, increasing the distance between the gripping and anvil electrodes 17 and 14 so that there can be a uniform predetermined flow of material into the bulbous formation at the end of the workpiece.

At the end of the upsetting operation the transformer 16 is deenergized and ram cylinder 22 is retracted to raise the pusher blade 24. However, the cam actuating cylinder 40 continues to extend until the follower 38 engages a sharp rise 74' in the cam surface (see Figure 8) which causes the carriage 18 and clamping electrodes 17 to raise, carrying therewith the finished workpiece. In this respect, it will be understood that the clamping electrodes 17 grip the workpiece with a greater force than do the jaws 68, so that as the carriage 18 is rapidly raised the workpiece is lifted above the anvil electrode 14.

Once the workpiece is clear of the anvil electrode, the electrode clamping cylinder 54 is retracted to open electrodes 17, and transfer cylinder is actuated to retract the transfer table 59, the workpiece 49 being engaged and supported by the gripper jaws 68 at this time. While the table 59 is retracting, and before it reaches its outer limit station under the loading device 13, the cylinder 70 is actuated to open the gripper jaws and permit the finished workpiece 49 to drop free, onto a suitable conveyor, container, or other receiver, not shown.

Figure 10:
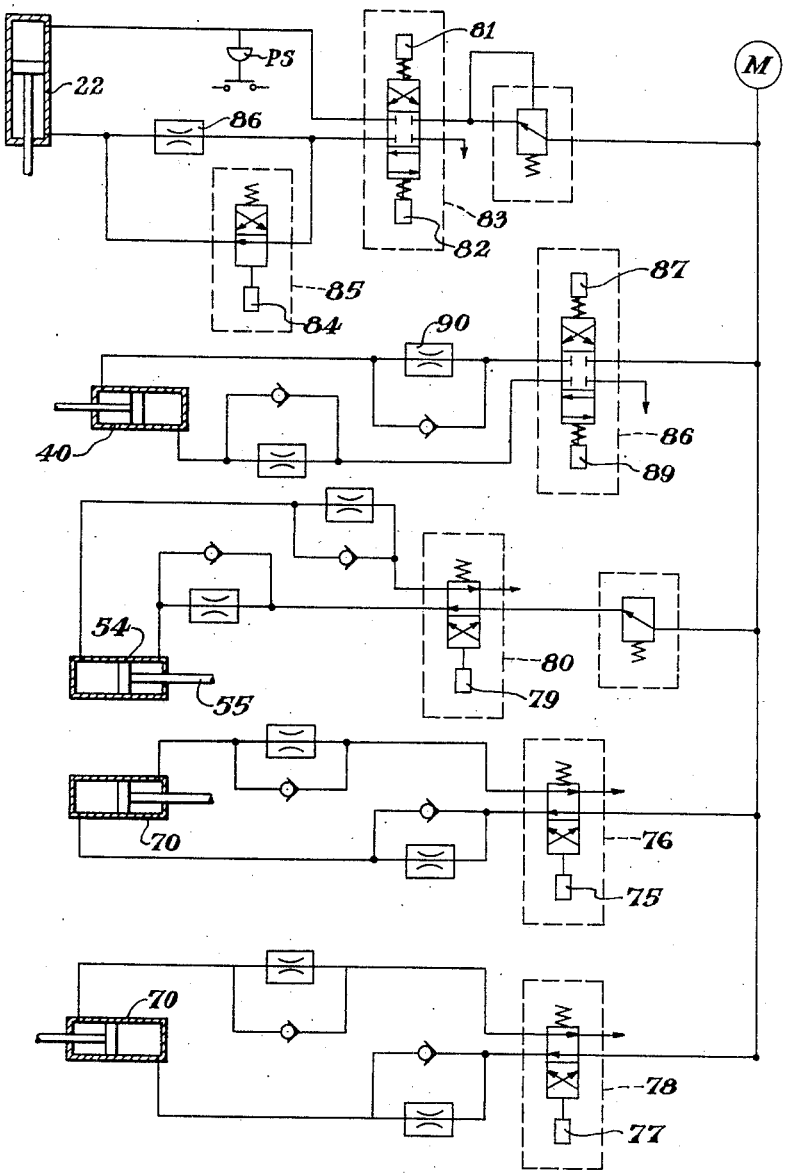
Figure 10 is a simplified schematic representation of the hydraulic actuating circuitry employed in connection with the apparatus of Figure 1.
Figure 11:
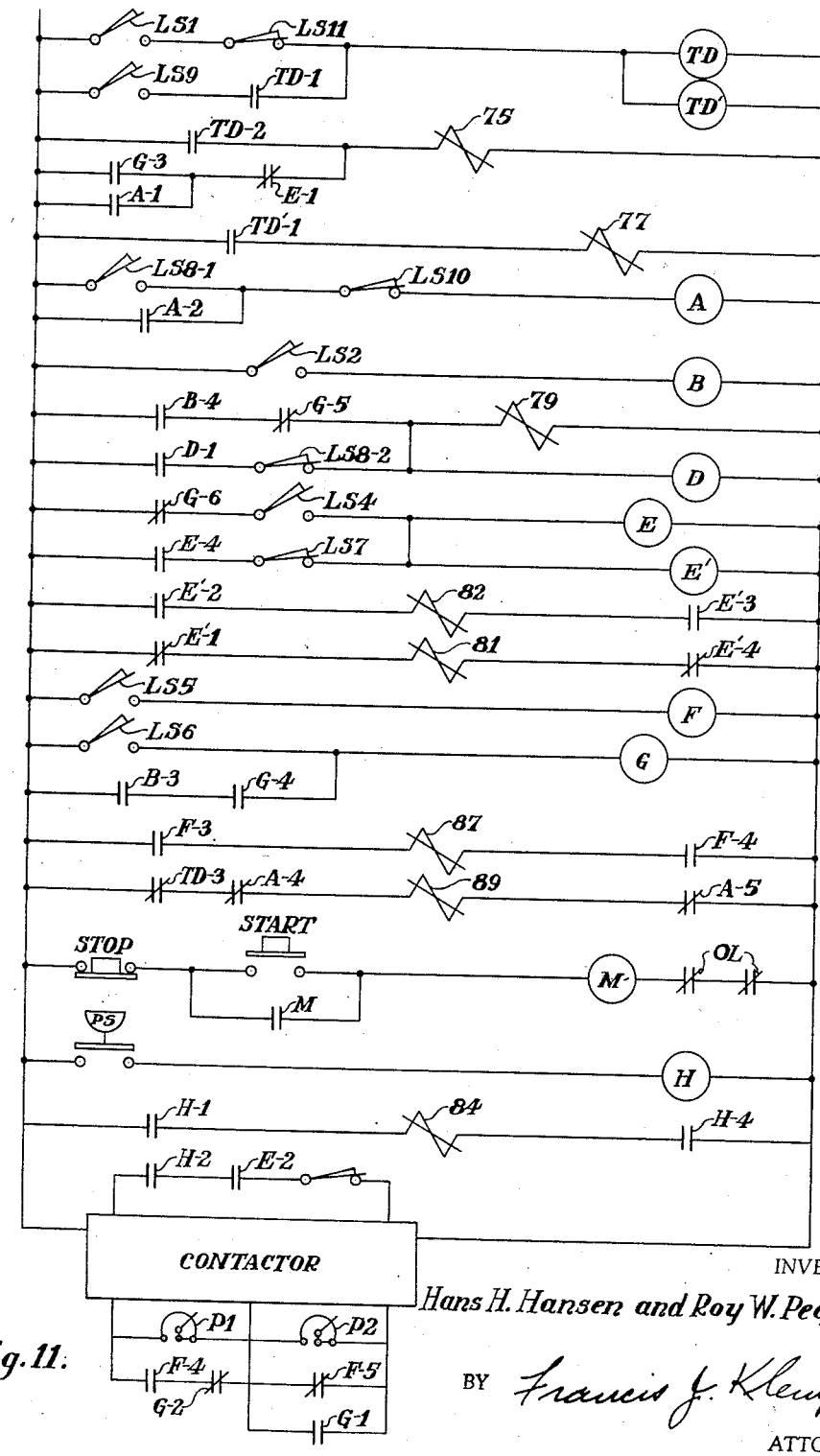
Figure 11 is a simplified schematic representation of the electric control circuitry employed in connection with the apparatus of Figure 1.

Referring now to Figures 10 and 11, illustrating simplified schematic hydraulic and electrical diagrams for use in connection with the apparatus heretofore described, LS1 designates a limit switch which is positioned in the guide member 62, below the delivery chute 65, to be actuated as a fresh workpiece is dropped into the grooved guide member 62. Closing of LS1 completes a circuit through a second limit switch LS2 to a pair of parallel connected time delay relays TD and TD'. The time delay relays are adjusted to actuate at different time periods, relay TD actuating slightly before relay TD'. The arrangement is such that after a first delay period contacts TD-2 close to energize a solenoid 75, shifting valve 76 to a position wherein fluid is directed into the inner or rod end of jaw actuating cylinder 70, causing the same to retract to close the gripping jaws upon the workpiece. After a second delay period, slightly longer than the first, contacts TD'-1 close to energize solenoid 77, shifting valve 78 to a position in which fluid is directed into the rod end of transfer cylinder 60. At this time the transfer table 59 is moved toward the upsetting machine until the workpiece is aligned with the operating axis of the apparatus.

When the workpiece is properly positioned, the transfer table 59 trips a limit switch LS2, completing a circuit to and energizing a control relay B. Contacts B-4 are thereby closed to energize solenoid 79, shifting valve 80 to a position in which fluid is directed to the head end of cylinder 54. The operating rod 55 of cylinder 54 is thereby caused to extend to bring the clamping electrodes 17 into engagement with the workpiece. Through a circuit in parallel with control relay B, a further control relay D is also energized upon the closing of switch LS2. Contacts D-1 of this latter relay establish through limit switch LS8-2 a holding circuit for valve solenoid 79 which is independent of the control relay B.

As the clamping electrodes are moved into clamping position, a limit switch LS4 is closed, energizing control relays E and E'. This simultaneously closes normally open contacts E'-2 and E'-3 and opens normally closed contacts E'-1 and E'-4, to deenergize solenoid 81 and energize solenoid 82. The latter solenoids cooperatively control a four-way valve 83, and upon conditioning of the solenoids as above described the valve shifts so that pressure fluid is directed from the pump M to the upper end of the cylinder 22, causing the ram and pusher blade 24 to be lowered into contact with the workpiece.

Lowering of the pusher blade 24 causes the workpiece to be brought into pressure engagement with the anvil electrode 14, whereupon there is a sudden increase of fluid pressure in the upper end of the ram cylinder 22. This sudden increase in pressure causes a pressure switch PS to close, completing a circuit to and energizing a control relay H. Contacts H-1 and H-4 of this last mentioned relay close to energize a solenoid 84 which controls a by-pass valve 85 in the fluid circuit leading to the lower or rod end of ram cylinder 22. When solenoid 84 is energized the valve 85 is shifted to a closed position so that fluid exhausting from the lower end of cylinder 22 is forced to pass through a throttle valve 86. Thereafter the cylinder 22 operates against a certain back pressure and is caused to move at a controlled rate of speed.

Contacts H-2 of relay H are also closed upon energization of the latter, completing an energizing circuit for the power transformer 16 so that heating current is caused to flow to the workpiece.

As the material of the workpiece begins to soften and yield, gathering between the electrodes 14 and 17, the pusher blade 24 descends, and in doing so closes a limit switch LS5, energizing a control relay F. Contacts F-4 and F-5 thereupon close and open respectively to increase the energization of the transformer 16. This is desired in many cases to compensate for such factors as the increased cross section of the bulbous gathering of material, for example, as fully set forth in the co-pending application Ser. No. 444,766 of Joseph J. Riley et al., filed July 21, 1954, for "Method and Apparatus for Hot Upsetting."

Energization of control relay F also closes contacts F-3 and F-4 thereof, completing a circuit for and energizing solenoid 87. The latter solenoid is associateed with a double-solenoid four-way valve 88, and is arranged when energized to shift the valve to a position wherein fluid is directed into the head end of cam actuating cylinder 40. This causes the cam 21 to move forwardly, retracting the carriage 18 and clamping electrodes 17 away from the anvil electrode 14 in the manner desired to provide for the proper expansion of the bulbous mass of material gathering between the electrodes.

A second solenoid 89 is employed for reversing the flow of fluid to the cam actuating cylinder 40. However, in the energizing circuit for solenoid 89 are normally closed contacts TD-3 of the time delay relay TD, which contacts were opened sometime prior to the initiation of the upsetting operation, as will be recalled, so that relay 89 remains deenergized.

In order to accurately regulate the speed of movement of the cam actuating cylinder 40 there is provided an adjustable flow control valve 90 in the circuit leading to the rod end of the cylinder. The arrangement being such that fluid is permitted to escape from the rod end at an accurately controllable and adjustable rate of flow; and in this manner the retraction of the clamping electrodes is accurately controlled.

As the upsetting operation proceeds, the ram and pusher blade 24 descend at a controlled rate and the electrode carriage 18 retracts at a controlled rate, until at a time slightly prior to the end of the operation a limit switch LS6 is closed by the ram 23, completing an energizing circuit to control relay G. At this point contacts G–1 and G–2 close and open respectively to reduce the heating level to its initial value. The ram 23 then continues in its downward movement until it contacts and opens a limit switch LS7 in the holding circuit for relays E and E'. Contacts E–2 open to deenergize the main transformer 16, and contacts E'–1 through E'–4 operate to deenergize solenoid 82 and energize solenoid 81 so that fluid is directed to the lower or rod end of ram cylinder 22. Exhausting of the upper end of cylinder 22 immediately opens the pressure switch PS to deenergize control relay H and solenoid 84 of the by-pass valve 85. The throttle valve 86 is thus shunted or by-passed out of the fluid circuit leading to the lower end of cylinder 22 so that the same may be rapidly retracted.

Even though the flow or heating current is now terminated, and the pusher blade 24 is moving in a retracting direction, solenoid 87 remains energized to maintain the carriage operating cam 21 moving in a forwardly direction. The carriage thus continues to raise, carrying with it the finished workpiece. In this manner the lower end of the workpiece is lifted clear of the anvil die 14. And in this respect, the active surface 74 of cam 21 is provided with a sharp riser portion 74', as shown in Figure 8, so that the carriage is lifted rapidly at the end of the upsetting operation.

At the end of the forward movement of the cam 21 limit switches LS8–1 and LS8–2 are closed and opened respectively to deenergize control relay D and energize control relay A. Contacts D–1 then open to deenergize solenoid 79 and cause clamping cylinder 54 to retract. This opens the clamping electrodes 17, so that the workpiece is then supported only by the gripping jaws 68, and causes a limit switch LS9 to be opened to deenergize timing relays TD and TD'. Contacts TD'–1 now open to deenergize valve solenoid 77, causing the transfer cylinder 60 to shift the table 59 toward its retracted position. At the same time contacts TD–2, in circuit with valve solenoid 75, open, but this latter solenoid remains energized through a parallel circuit including now closed contacts A–1 of relay A.

As the transfer table 59 begins to move in a retracting direction limit switch LS2 is opened to deenergize control relay B, and through then open contacts B–3 to deenergize relay G. Solenoid 75 is now held energized only by the closed contacts A–1 of relay A and normally closed contacts E–1. Thus, upon further retraction of the transfer table 59 a limit switch LS10 is opened to deenergize relay A, open contacts A–1 thereof, deenergize valve solenoid 75, and thereby cause the jaw actuating cylinder 70 to open the gripping jaws 68, dropping the finished workpiece into a conveyor or receiver, not shown. The transfer table 59 then continues to move in a retracting direction until it reaches its outer limit position.

During the upward or retracting movement of the ram 23 limit switches LS6 and LS5 are successively opened, opening of the latter being effective to deenergize relay F and valve solenoid 87 so that the cam actuating cylinder 40 ceases to move in a forwardly or extending direction. At some later time, when relay A is deenergized during the retracting movement of the transfer table 59 valve solenoid 89 is energized so that the cam actuating cylinder 40 is reversed and caused to retract to its initial position.

Continued movement of the ram 23 into its upper or retracted limit position causes limit switch LS11 to be closed so that the apparatus is conditioned for a further operational cycle upon the dropping of a new workpiece out of the delivery chute 65.

It should thus be apparent that we have accomplished the objects initially set forth. We have provided a highly improved and advanced apparatus for carrying out hot upsetting operations on a mass production basis, with a minimum of operator attention, and with consistently superior results.

One of the important features of the invention is the provision of a novel loading and transfer mechanism and integrated control therefor whereby workpieces may be conveniently and properly loaded and positioned in the upsetting apparatus. Our transfer mechanism comprises yieldable gripping jaws for temporarily supporting a workpiece during transfer into and out of the upsetting machine, in addition to a slotted and grooved workpiece guiding member which properly aligns the workpiece prior to loading and guides and supports it during the actual upsetting operation. The workpiece guiding member is provided with a forwardly opening slot which is adapted upon transverse movement of the transfer mechanism into operating position in the upsetting apparatus to be received about the workpiece engaging pusher blade 24 so that the latter is also properly supported and guided throughout the whole of the upsetting operation.

Another important feature of the invention is our novel anti-frictionally supported movable electrode supporting carriage which is actuated during the upsetting operation by means of a hydraulic cylinder through the intermediary of a cam device which effects a high reduction between movements of the actuating cylinder and the resulting movements of the electrode carriage. The arrangement is such that an extremely accurate control over the movements of the electrode carriage is afforded. Moreover, for the hot upsetting of parts of intricate and unusual shape appropriately contoured cam members may be employed so that upon a uniform and accurately controlled actuation of the cam operating cylinder a varied pattern of movement of the electrode carriage will result.

Of course, it will be readily apparent that whenever desired the ram 23 and pusher blade 24 may be provided with an accurately controllable actuating mechanism of the type herein employed in connection with the carriage 18 without departing from the clear scope and teachings of the invention.

Combined with the movable electrode supporting carriage 18 we provide a novel mechanism for moving the electrodes 17 into and out of clamping relation with a workpiece. To this end there is provided an operating cylinder which is mounted upon the carriage and which is arranged to actuate the clamping electrodes 17 through a linkage which insures equal and exact movements of the electrodes so that the same are at all times in symmetrical relation to the operating axis of the apparatus. The electrodes will of course wear because of the continual sliding therethrough of workpieces, and our actuating mechanism is so arranged that the workpieces continue to be clamped in accurate alignment in the machine, even after considerable wear upon the electrodes.

The invention also includes such other important features as novel control instrumentalities for effecting substantially automatic operation, and may specific features of construction contributing to a highly improved overall apparatus. It should be understood, however, that the embodiment of the invention herein illustrated and specifically described is intended to be illustrative only. Reference should therefore be made to the following appended claims in determining the true scope of the invention.

We claim:

1. In an apparatus for hot upsetting metal workpieces including a frame, electrode members for engaging a workpiece at spaced points, means to supply current to said electrodes, means movable along the principal axis of said apparatus in a first direction for applying pressure to said workpiece to cause a deformation thereof between said electrodes, and means to move one of said electrode members along said axis in a second direction, the improvement in said last mentioned means which comprises an electrode mounting carriage positioned in offset relation to said principal axis and movable in parallel relation thereto, means mounting said carriage to said frame including a plurality of anti-friction rollers, and means to move said carriage comprising a rectilinearly movable cam disposed transversely to the axis of said carriage.

2. In an apparatus for hot upsetting metal workpieces including a frame, electrode members for engaging a workpiece at spaced points, means to supply current to said electrodes, means movable along the principal axis of said apparatus in a first direction for applying pressure to said workpiece to cause a deformation thereof between said electrodes, and means to move one of said electrode members along said axis in a second direction, the improvement in said last mentioned means which comprises an electrode mounting carriage positioned in offset relation to said principal axis and movable in parallel relation thereto, a cam carried by said frame for rectilinear movement in transverse relation to the axis of said carriage, and means to move said cam comprising a fluid cylinder and flow control valve therefor.

3. Apparatus according to claim 2 further characterized by said cam comprising a flat plate-like member, means comprising a first plurality of spaced anti-friction rollers engaging the upper and lower edges of said cam for guiding the same in horizontal transverse movements, said cam having a contoured slot therein, a member driven by said cam and having a vertically elongated opening therein receiving said cam, said driven member having an anti-friction follower roller received within said slot, a second plurality of anti-friction rollers engaging opposite side edges of said driven member for guiding the same in vertical movements, and means interconnecting said carriage and said driven member.

4. Apparatus according to claim 3 further characterized by said first and second plurality of anti-friction rollers being journaled upon common axes.

5. Apparatus according to claim 2 further characterized by said cam comprising a flat plate-like member, anti-friction means journaled upon four parallel rectangularly related axes for engaging the upper and lower edges of said cam and guiding the same in horizontal transverse movements, means driven by said cam and connecting said carriage, and means to guide said driven means in vertical movements comprising anti-friction means journaled upon said axes and engaging opposite side edges of said driven means.

6. In an apparatus for hot upsetting metal workpieces and of the type having first and second electrode means, said first electrode means adapted to releasably grip a workpiece intermediate its ends, and means to move a workpiece transversely into operative alignment with an axis defined by said electrode means, the improvement in said first electrode means comprising a movable carriage, a pair of electrode supporting arms pivoted on said carriage about an axis parallel to but offset from said first mentioned axis, actuating links for said arms pivotally interconnecting the same intermediate said second mentioned axis and the electrodes supported by said arms, a common driving link interconnecting said actuating links, a fluid cylinder rigidly mounted on said carriage and interconnecting said driving link, and means to guide said driving link upon actuation of said fluid cylinder whereby said electrode arms remain exactly symmetrical with said first mentioned axis at all times.

7. Apparatus according to claim 6 further characterized by said carriage having a boss-like projection mounting said cylinder and having a transverse window therein for receiving said driving link, said cylinder being rigidly mounted on said projection and having its operating rod rigidly connected to said driving link and extending therethrough and slidably received in said carriage on the opposite side of said driving link, the arrangement being such that said operating rod is guided upon opposite sides of said driving link to maintain the latter in accurate alignment during actuating movements thereof.

8. In an apparatus for hot upsetting metal workpieces of the type having first and second electrode means, said first electrode means being adapted to releasably grip a workpiece intermediate its ends, and means to move a workpiece transversely into operative alignment with an axis defined by said electrode means, the improvement in said first electrode means comprising a pair of electrode supporting arms mounted for pivoting movement, electrodes carried at free end portions of said arms adapted upon pivoting movement of said arms to close upon said axis, a fluid cylinder for pivoting said arms to open and close said electrodes, actuating linkage interconnecting said arms and the operating rod of said fluid cylinder, and means independent of said cylinder for accurately guiding and supporting said actuating rod whereby to insure symmetrical opening and closing of said electrodes with respect to said axis.

9. Apparatus according to claim 8 further characterized by the operating rod of said cylinder having portions projecting outwardly of the point of interconnection between said rod and said actuating linkage, and further including means to rigidly mount said cylinder, said means including portions slidably receiving the projecting portions of said operating rod whereby the same is accurately guided on opposite sides of said point of interconnection.

10. Apparatus according to claim 8 further characterized by said electrode supporting means having means therein for adjustably receiving said electrodes.

11. In an apparatus for hot upsetting rod-like metal workpieces including a frame, electrode means for engaging a workpiece at spaced points, means to supply current to said electrodes, means movable along the principal axis of said apparatus in a downward direction for applying pressure to said workpiece to cause a deformation thereof between said electrodes, means to move certain of said electrode means in work clamping and releasing directions toward and away from said axis, and means to position a workpiece in operative alignment with said axis, the improvement in said last mentioned means comprising a transfer table mounted on said frame for movement toward and away from said axis, a guiding and supporting member carried on said transfer table and having means therein to receive a workpiece and support the same throughout a substantial portion of its length, means on said transfer table to resiliently grip a workpiece so received during transfer movements of said table toward and away from said axis, said means to grip being positioned above said certain of said electrodes, and means to move said transfer table toward and away from said axis.

12. Apparatus according to claim 11 further characterized by said guiding and supporting member having a vertically elongated inwardly opening slot therein of less width than the diameter of said workpiece, said slot having vertically extending arcuate grooves therein for closely receiving said workpiece, and said means for applying pressure comprising a blade-like member adapted upon inward movement of said transfer table to be closely received within said slot and to be guided and supported thereby while applying pressure to said workpiece.

13. Apparatus according to claim 11 further characterized by said transfer table being slidably supported upon a platform comprsing a fixed part of said frame, and further including a resiliently mounted abutment member mounted on said platform and positioned beneath said guiding and supporting member when said transfer table is positioned in a retracted or workpiece receiving limit position, said abutment member having an upper surface located in predetermined relation to said electrodes and adapted to engage the lower end of a workpiece upon reception thereof in said guiding and supporting member and prior to the gripping of said workpiece whereby upon transfer movement of said table toward said axis said workpiece is accurately positioned longitudinally with respect to said electrodes.

14. In an apparatus for hot upsetting rod-like metal workpieces and of the type having an anvil electrode having abutting engagement with one end of a workpiece, a second electrode having engagement with said workpiece intermediate its ends, and means to apply pressure to the other end of said workpiece, the improvement comprising a guiding and supporting member for said workpiece positioned on the opposite side of said other electrode from said anvil electrode and extending along the axis defined by said electrodes, said guiding and supporting member having an axially extending slot therein of lesser width than the diameter of said workpiece, said slot having axially aligned arcuate grooves therein for closely receiving said workpiece for guiding and supporting the same throughout a major portion of its length, and said means to apply pressure comprising a blade-like member complementary to and closely received in said slot and guided and supported therein during the application of pressure to said workpiece.

15. Apparatus according to claim 14 further characterized by said guiding and supporting member being vertically aligned, and further including resiliently actuated workpiece gripping jaws carried adjacent the lower end of said member for frictionally engaging a workpiece received in said member.

16. Apparatus according to claim 15 further characterized by said gripping jaws being pivotally mounted and including spring means to normally urge said jaws in a workpiece gripping direction, and further including means to overcome said spring means comprising a fluid cylinder and a cam-like member actuated by said fluid cylinder and adapted upon movement into engagement with said jaws to release a workpiece held thereby.

17. In an apparatus for hot upsetting metal workpieces and having an anvil electrode, work clamping electrodes adapted to engage a workpiece intermediate its ends, a transfer mechanism including a pair of jaws for frictionally gripping a workpiece for transferring the same to and from operative alignment with the axis defined by said electrodes, means to apply pressure to a workpiece engaged by said clamping electrodes and abutting said anvil electrode, and means to retract said clamping electrodes from said anvil electrode during an upsetting operation, the improvement characterized by said clamping electrodes being adapted to exert a greater frictional grip upon said workpiece than said gripping jaws, and said means to apply pressure being adapted to overcome the frictional grip of both said jaws and said clamping electrodes, first control means operative upon completion of an upset to cause said means to apply pressure to be retracted from said workpiece, second control means adapted subsequently after a predetermined further raising movement of said clamping electrodes to release said electrodes from clamping engagement with said workpiece, and third control means adapted upon release of said electrodes to cause said transfer mechanism to be actuated to remove said workpiece, the arrangement being such that subsequent to the retraction of said means to apply pressure said workpiece is retracted from said anvil electrode against the frictional grip of said jaws by the greater frictional grip of said clamping electrodes, while upon release of said clamping electrodes said workpiece remains gripped in said jaws for transfer movement from said axis.

18. Apparatus according to claim 17 further characterized by said means to retract said clamping electrodes comprising a cam, means to move said cam at a substantially uniform rate throughout a sequence of operations of said apparatus, said cam having a sharp change of contour adapted following upsetting of the workpiece and retraction of said means to apply pressure to rapidly retract said clamping electrodes and said workpiece from said anvil electrode.

19. In an apparatus for hot upsetting metal workpieces and having an anvil electrode, work clamping electrodes adapted to engage a workpiece intermediate its ends, a transfer mechanism including a pair of jaws for frictionally gripping a workpiece for transferring the same in a transverse direction to and from operative alignment with the axis defined by said electrodes, means to retract said clamping electrodes from said anvil electrode during an upsetting operation, and means to apply pressure to a workpiece engaged by said clamping electrodes and abutting said anvil electrode, the improvement comprising first control means operative upon completion of an upset to retract said means to apply pressure and to continue retraction of said clamping electrodes, and second control means operative upon a predetermined continued retraction of said clamping electrodes to release the same from clamping engagement and to actuate said transfer mechanism to remove said workpiece in a transverse direction from said axis.

20. In an apparatus for hot upsetting metal workpieces and of the type having electrodes for heating a portion of a workpiece, means to supply electrical energy to said electrodes, and fluid pressure means for applying pressure to a workpiece during an upsetting operation, the improvement comprising fluid circuitry for said last mentioned means including a throttling valve and by-pass valve in parallel, said by-pass valve being normally open whereby said means may be rapidly moved into pressure applying relation to a workpiece, pressure responsive means adapted in response to an increase in pressure in said last mentioned means upon the same engaging a workpiece to close said by-pass valve whereby fluid is caused to pass in a regulated manner through said throttling valve, and electrical control means associated with said means to supply electrical energy to energize the same in response to said increase in pressure.

References Cited in the file of this patent

UNITED STATES PATENTS

| | | |
|---|---|---|
| 1,849,185 | Giacchino | Mar. 15, 1932 |
| 1,870,987 | Drake | Aug. 9, 1932 |